US010631315B2

(12) United States Patent
    Shivamurthy et al.

(10) Patent No.: US 10,631,315 B2
(45) Date of Patent: Apr. 21, 2020

(54) COMMUNICATION DEVICE AND METHOD FOR PERFORMING RADIO COMMUNICATION

(71) Applicant: Intel IP Corporation, Santa Clara, CA (US)

(72) Inventors: Shivakumar Shivamurthy, Bangalore (IN); Rajshekhar Oruganti, Bangalore (IN)

(73) Assignee: Apple Inc., Cupertino, CA (US)

( * ) Notice: Subject to any disclaimer, the term of this patent is extended or adjusted under 35 U.S.C. 154(b) by 312 days.

(21) Appl. No.: 14/864,974

(22) Filed: Sep. 25, 2015

(65) Prior Publication Data

US 2017/0094678 A1    Mar. 30, 2017

(51) Int. Cl.
*H04W 72/12* (2009.01)
*H04W 72/08* (2009.01)
*H04W 88/06* (2009.01)

(52) U.S. Cl.
CPC ..... *H04W 72/1247* (2013.01); *H04W 72/082* (2013.01); *H04W 72/1215* (2013.01); *H04W 88/06* (2013.01)

(58) Field of Classification Search
CPC .................. H04W 72/1247; H04W 72/082
See application file for complete search history.

(56) References Cited

U.S. PATENT DOCUMENTS

| 2010/0183061 | A1* | 7/2010 | Imahashi | ............... | H04B 1/005 |
| | | | | | 375/222 |
| 2011/0207453 | A1 | 8/2011 | Hsu et al. | | |
| 2013/0053076 | A1 | 2/2013 | Chang et al. | | |
| 2013/0079025 | A1 | 3/2013 | Chen et al. | | |
| 2013/0150013 | A1 | 6/2013 | Liu et al. | | |
| 2016/0128071 | A1* | 5/2016 | Ngai | .................... | H04W 72/082 |
| | | | | | 370/329 |
| 2016/0150568 | A1* | 5/2016 | Dhanda | ............... | H04L 65/1066 |
| | | | | | 370/235 |

(Continued)

FOREIGN PATENT DOCUMENTS

| CN | 101217745 A | 7/2008 |
| CN | 101222715 A | 7/2008 |
| CN | 102970673 A | 3/2013 |

(Continued)

OTHER PUBLICATIONS

Chinese Office Action including Chinese Search Report issued for corresponding application No. 201610730052.3, dated Jun. 5, and dated dated May 28, 2019, 13 pages (for informational purpose only).

*Primary Examiner* — Shripal K Khajuria

(57) ABSTRACT

A communication device and a method for communication is provided. The communication device includes a first subscriber identity module, a second subscriber identity module, a first baseband circuit associated with the first subscriber identity module, a second baseband circuit associated with the second subscriber identity module and a radio frequency circuit coupled to the first baseband circuit and the second baseband circuit. The radio frequency circuit is configured to provide at least one of the first baseband circuit or the second baseband circuit with a collision information about a transmission collision or receiving collision of data associated with the first baseband circuit or the second baseband circuit.

23 Claims, 11 Drawing Sheets

(56) References Cited

U.S. PATENT DOCUMENTS

2016/0212782 A1* 7/2016 Ko ..................... H04W 68/005
2016/0227557 A1* 8/2016 Fanous ............. H04W 72/1215

FOREIGN PATENT DOCUMENTS

| | | |
|---|---|---|
| CN | 103024829 A | 4/2013 |
| CN | 103167610 A | 6/2013 |
| CN | 104144406 A | 11/2014 |
| CN | 104144528 A | 11/2014 |

* cited by examiner

COMMUNICATION DEVICE AND METHOD FOR PERFORMING RADIO COMMUNICATION

TECHNICAL FIELD

The present disclosure relates to mobile terminals and methods for performing radio communication.

BACKGROUND

In a scenario a mobile terminal has a plurality of baseband circuits that each are associated to a respective subscriber identity module. Further, the mobile terminal may have a lower number of antennas for signal transmission than the number of provided baseband circuits. In case of more communication channels than the number of antennas for transmission communication data inside of the mobile terminal may collide. Efficient approaches to address the issue of colliding data are desirable.

SUMMARY

A communication device and a method for communication is provided. The communication device includes a first subscriber identity module, a second subscriber identity module, a first baseband circuit associated with the first subscriber identity module, a second baseband circuit associated with the second subscriber identity module and a radio frequency circuit coupled to the first baseband circuit and the second baseband circuit. The radio frequency circuit is configured to provide at least one of the first baseband circuit or the second baseband circuit with a collision information about a transmission collision or receiving collision of data associated with the first baseband circuit or the second baseband circuit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
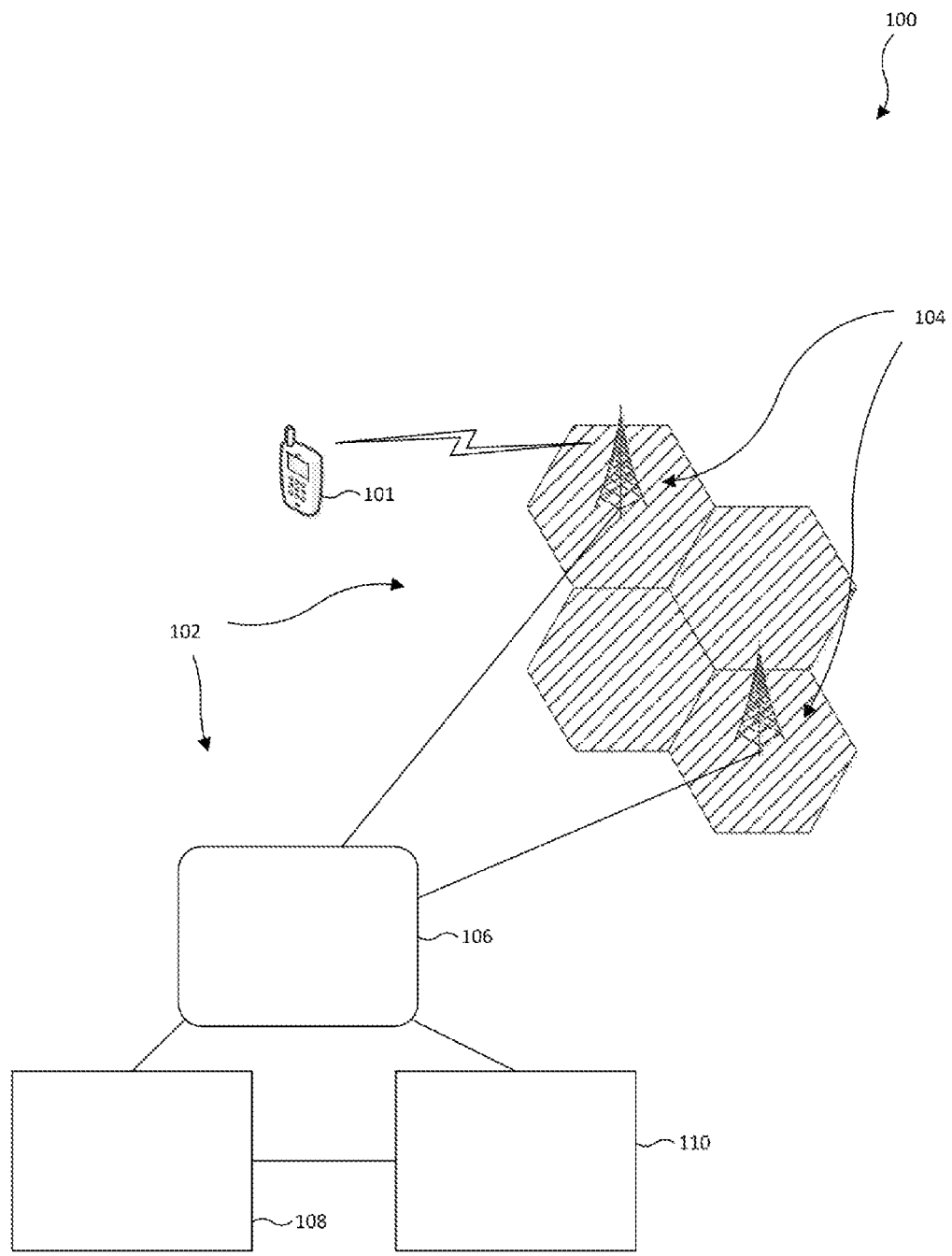
FIG. 1 shows a schematic diagram of a mobile radio communication system based on the GSM communication standard and a mobile phone according to a first example.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various aspects of this disclosure provide a communication device and a method for performing radio communication that efficiently address the issue of colliding data in the communication device in a simple manner.

By providing at least one of the first baseband circuit or the second baseband circuit with a collision information about a transmission collision or receiving collision of data associated with the first baseband circuit or the second baseband circuit, the respective baseband circuit is enabled to adjust to possible failures in the transmission process so that a radio link failure may be avoided. Further, the need for a timing synchronization of the communication data associated with two different radio connections is at least reduced so that the communication device can be constructed in a simpler manner and may consume less power. The first baseband circuit and the second baseband circuit may be not be connected to each other so that no communication between the baseband circuits is possible. The communication device may be used in a GSM (Global System for Mobile Communications) communication network; in other words, the communication device may be configured to communicate in accordance with the GSM communication standard. However, the usage of the communication device is not limited to a GSM communication network. It is perceivable to use such a communication device in UMTS (Universal Mobile Telecommunications Standard), LTE (Long Term Evolution) or LTE-Advanced or other communication networks. In other words, the communication device may be configured to communicate in accordance with UMTS, LTE or LTE-Advanced or other communication networks.

The collision information may include information about aborted transmission of data associated with the first baseband circuit due to a collision with data associated with the second baseband circuit. Thus, data that has not been transmitted can be identified by the baseband circuit that receives the collision information.

In an example, a first priority information may be assigned to the data associated with the first baseband circuit. Further, a second priority information may be assigned to the data associated with the second baseband circuit. Moreover, the radio frequency circuit may be configured to select the data for transmission according to a predefined scheduling scheme based on at least one of the first priority information or the second priority information. Thus, the selection of data by the radio frequency circuit can be influenced by assigning priority information to the data.

In an example, the radio frequency circuit may be configured to select the data for transmission which is assigned priority information indicating the higher priority.

The first subscriber identity module may include a first subscriber identity module card. Further, the second subscriber identity module may include a second subscriber identity module card.

At least one of the first baseband circuit or the second baseband circuit may be configured to re-schedule the transmission of the data based on the collision information if the transmission of the data of at least one of the first baseband circuit or the second baseband circuit to the radio frequency circuit is aborted. Thus, another possibility for transmitting the data may be provided.

In an example, at least one of the first baseband circuit or the second baseband circuit may be configured to change the priority information assigned to the data for the re-scheduled transmission of the data to increase the transmission priority of the data. Thus, the likelihood for a transmission of the data may be increased.

In various aspects of this disclosure, at least one of the first baseband circuit or the second baseband circuit may be configured to temporarily change the priority information assigned to the data for the re-scheduled transmission of the data as valid for at least one transport block. Thus, the likelihood for a transmission of the transport block may be increased. Further, the baseband processing circuits may transmit data alternately so that the delay of transmission of data from one of the baseband circuits may be short.

In an example, the first baseband circuit, the second baseband circuit, and the radio frequency circuit may be configured in accordance with a 2G (Second Generation) mobile radio communication technology.

The first baseband circuit, the second baseband circuit, and the radio frequency circuit may be configured in accordance with Global System for Mobile communications (GSM).

In an example, at least one of the first baseband circuit or the second baseband circuit may be configured to request the collision information from the radio frequency circuit. Thus, a waiting time or an idle time of the baseband circuits may be reduced. Further, communication errors between the baseband circuits may be detected. By way of example both baseband circuits request the collision information from the radio frequency circuit after one TDMA (Time Division Multiple Access) frame period.

In an example, the radio frequency circuit includes a single antenna. Thus, the communication device may be built in an especially simple manner.

The communication device may include a plurality of subscriber identity modules and a plurality of baseband circuits. Each baseband circuit of the plurality of baseband circuits may be associated with a subscriber identity module of the plurality of subscriber identity modules. Further, the communication device may include at least one radio frequency circuit. The number of radio frequency circuits may be less than the number of subscriber identity modules. Moreover, the at least one radio frequency circuit may be coupled to at least one baseband circuit of the plurality of baseband circuits. Furthermore, the at least one radio frequency circuit may be configured to generate a collision information about a transmission collision of data associated with the plurality of baseband circuits and to transmit the collision information to the at least one baseband circuit of the plurality of baseband circuits. Thus, the at least one baseband circuit may be enabled to adjust to possible failures in the transmission process. Further, the need for a timing synchronization of the communication data associated to different radio connections may be reduced or even removed so that the communication device can be constructed in a simpler manner.

In an example, the collision information may include information about aborted transmission of data associated with one baseband circuit of the plurality of baseband circuits due to a collision with data associated with another baseband circuit of the plurality of baseband circuits. Thus, the one baseband circuit may be enabled to adjust to the transmission collision.

In an example, a priority information may be assigned to the data associated with each baseband circuit. Further, the radio frequency circuit may be configured to select the data for transmission according to a predefined scheduling scheme based on at least the priority information. Thus, each baseband circuit may influence the selection of the data for transmission of the radio frequency circuit.

The radio frequency circuit may be configured to select the data for transmission which is assigned priority information indicating the highest priority.

Each of the plurality of subscriber identity modules may includes a respective subscriber identity module card.

The at least one baseband circuit of the plurality of baseband circuits may be configured to re-schedule the transmission of the data based on the collision information if the transmission of the data of the at least one baseband circuit of the plurality of baseband circuits to the radio frequency circuit is aborted. Thus, another possibility for the transmission of the data may be provided. The at least one baseband circuit may re-schedule the transmission at the next possible time slot of a TDMA based transmission.

In an example, the at least one baseband circuit of the plurality of baseband circuits may be configured to change the priority information assigned to the data for the re-scheduled transmission of the data to increase the transmission priority of the data. Thus, the probability of the transmission of the data in the re-scheduled transmission may be increased.

In an example, the at least one baseband circuit of the plurality of baseband circuits may be configured to temporarily change the priority information assigned to the data for the re-scheduled transmission of the data as valid for at least one transport block. Thus, the probability of the transmission of the transport block may be increased.

In an example, the plurality of baseband circuits and the at least one radio frequency circuit may be configured in accordance with a 2G mobile radio communication technology.

In an example, the plurality of baseband circuits and the at least one radio frequency circuit may be configured in accordance with Global System for Mobile communications (GSM).

The at least one of the baseband circuits may be configured to request the collision information from the radio frequency circuit. Thus, an error in the connection between the one baseband circuit and the radio frequency circuit can be detected.

The at least one radio frequency circuit includes a single antenna.

The collision information may include a time window information. Further, the at least one baseband circuit of the plurality of baseband circuits may be configured to re-schedule the transmission of the data within a time window indicated by the time window information. Thus, the radio frequency circuit may be enabled to determine that a failure of a connection associated to the data with the one baseband circuit has occurred.

Furthermore, a method for performing radio communication is provided. The method includes receiving or transmitting a first data associated with a first baseband circuit. The first baseband circuit may be associated with a first subscriber identity module. Further, if a transmission collision or receiving collision occurs between the first data and a second data associated with a second baseband circuit that is associated with a second subscriber identity module sending at least one of the first baseband circuit or the second baseband circuit a collision information about the transmission collision or receiving collision of data associated with the first baseband circuit or the second baseband circuit.

Further, another method for performing radio communication is provided, the method including receiving or transmitting a first data associated with at least one baseband circuit of a plurality of baseband circuits. Each baseband circuit of the plurality of baseband circuits may be associated with a subscriber identity module of a plurality of subscriber identity modules. If a transmission collision or receiving collision of the first data with a second data associated with the plurality of baseband circuits is determined the at least one baseband circuit may be provided with a collision information about the transmission collision or receiving collision of the first data.

It should be noted that aspects described in the context of the previous examples may be analogously valid for the above provided methods.

"Uplink" is to be understood to mean the signal transmission from a mobile radio user terminal, e.g. a mobile phone, to the mobile radio base station and "downlink" is to be understood to mean the signal transmission from the mobile radio base station to the mobile radio user terminal.

FIG. 1 shows a schematic diagram of a mobile radio communication system 100 based on the GSM communication standard and a mobile phone 101 according to a first example. The mobile radio communication system 100 has a plurality of radio network subsystems 102 that include a base station subsystem 104, a network switching subsystem 106, a core network 108 and an operations support system 110. The operations support system 110 may include computer systems that support management functions for the network switching subsystem 106 and the core network 108.

The core network 108 is the central part of a general package radio service (GPRS) that may be connected to the base station subsystem 104 and allows the mobile network to transmit IP packets to external networks such as the Internet. The base station subsystem 104 may include base transceiver stations, base station controllers and transcoders and may be responsible for handling the traffic and signaling between the mobile phone 101 and the network switching subsystem 106.

Figure 2:
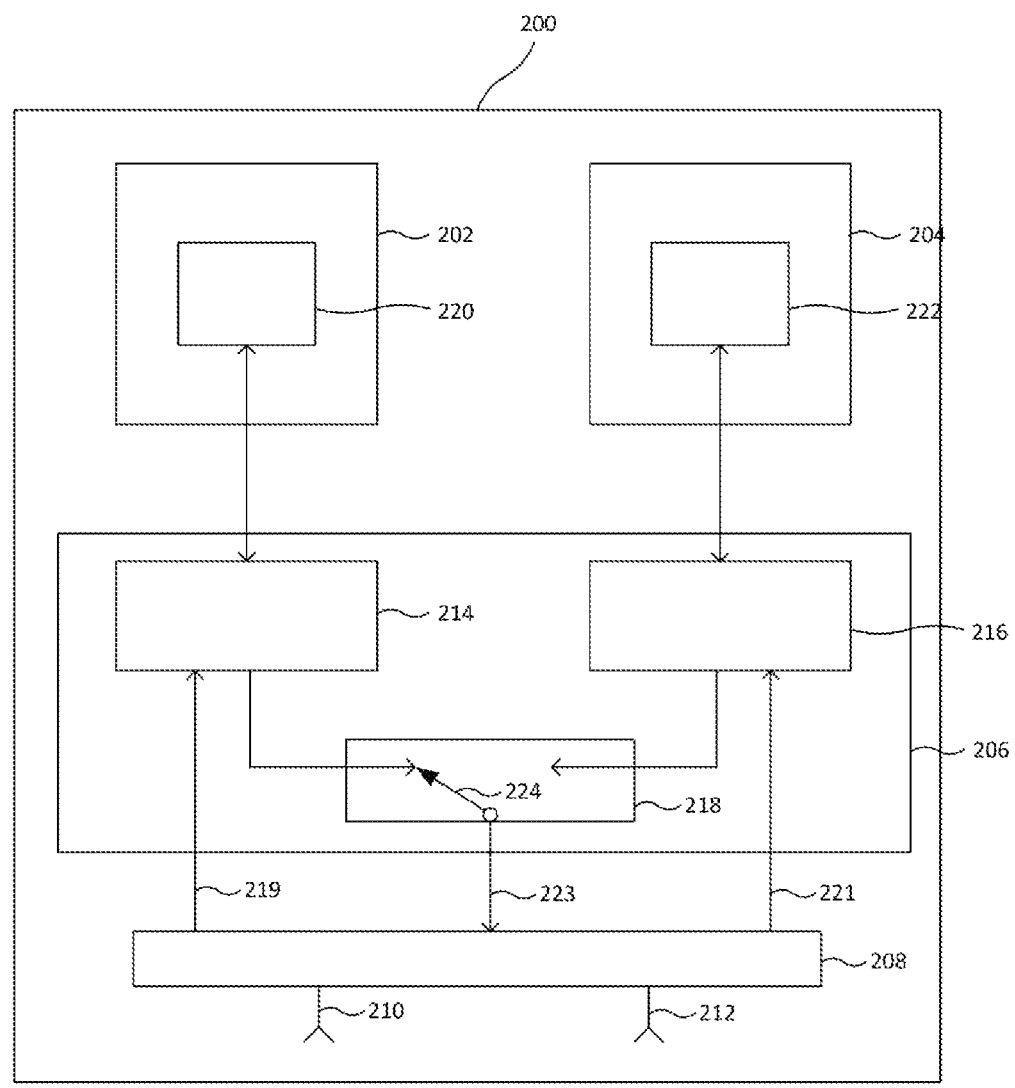
FIG. 2 shows a schematic drawing of the mobile phone.

FIG. 2 shows a schematic drawing of the mobile phone 101 that may include a first subscriber identity module 202 (SIM), a second subscriber identity module 204 (SIM), an RF processing circuit 206 (radio frequency processing circuit), a front end module 208 (FEM), a first antenna 210 that is configured to transmit and receive data and a second antenna 212 that is configured to receive data only. The RF processing circuit 206 may include a first processing circuit 214, a second processing circuit 216 and a switching circuit 218. The front end module 208 may be connected to the first processing circuit 214 via a first link 219, to the second processing circuit 216 via a second link 221 and to the switching circuit 218 via a third link 223. The switching circuit 218 may be connected to the first processing circuit 214 and the second processing circuit 216. The first processing circuit 214 may be connected to a first baseband processing circuit 220 of the first subscriber identity module 202 and a second baseband processing circuit 222 of the second subscriber identity module 204. The connections and links between the baseband processing circuits 220, 222, the processing circuits 214, 216, the switching circuit 218 and the front end module 208 may be wire connections and may be equipped for the transmission of data. The front end module 208 may be equipped to transmit data received by the first antenna 210 to the first processing circuit 214 via the first link 219. Further, the front end module 208 may be equipped to transmit data received by the second antenna 212 to the first processing circuit 214 via the second link 221. The processing circuits 214 and 216 may be equipped to transmit data to the switching circuit 218, respectively. The switching circuit 218 may be equipped to transmit data to the front end module 208. The direction of transmission of data that is transmitted via the links 219, 221 and 223 is indicated by an arrow associated to the links 219, 221 and 223, respectively.

Further, the switching circuit 218 may either enable the transmission of data from the first baseband processing circuit 220 to the RF processing circuit 206 and abort the transmission of data from the second baseband processing circuit 222 to the RF processing circuit 206 or the switching circuit 218 may enable the transmission of data from the second baseband processing circuit 222 to the RF processing circuit 206 and aborts the transmission of data from the first baseband processing circuit 220 to the RF processing circuit 206. The decision of the switching circuit 218 the transmission of which data is to be enabled and the transmission of which data is to be aborted may be based on priority information associated to the data. In FIG. 2, the transmission of data packets from the first baseband processing circuit 220 to the switching circuit 218 is enabled which is indicated by the arrow 224. Further, the transmission of data packets from the second baseband processing circuit 222 to the switching circuit 218 is aborted so that the transmission of the data packets is disabled.

The switching circuit 218 may consider the priority information before, during or after the data that the priority information is associated to arrives at the RF processing circuit 206. In case the switching circuit 218 considers the priority information before or during the arrival of the data at the RF processing circuit 206 the respective processing circuit 214 or 216 may enable or abort the reception of the data in consideration of the priority information. In case the switching circuit 218 considers the priority information after the arrival of the data at the RF processing circuit 206 the transmission of the data to the front end module 208 may be enabled or aborted in consideration of the priority information.

A transmission from the baseband processing circuit 220 and/or 222 to the RF processing circuit 206 may imply the reception of data by the RF processing circuit 206 without an abortion of the transmission of the data to the front end module 208. Further, an aborted transmission may imply the reception of data by the RF processing circuit 206 and an abortion of the transmission of the data to the front end module 208 or an abortion of the reception of the data.

Figure 3:
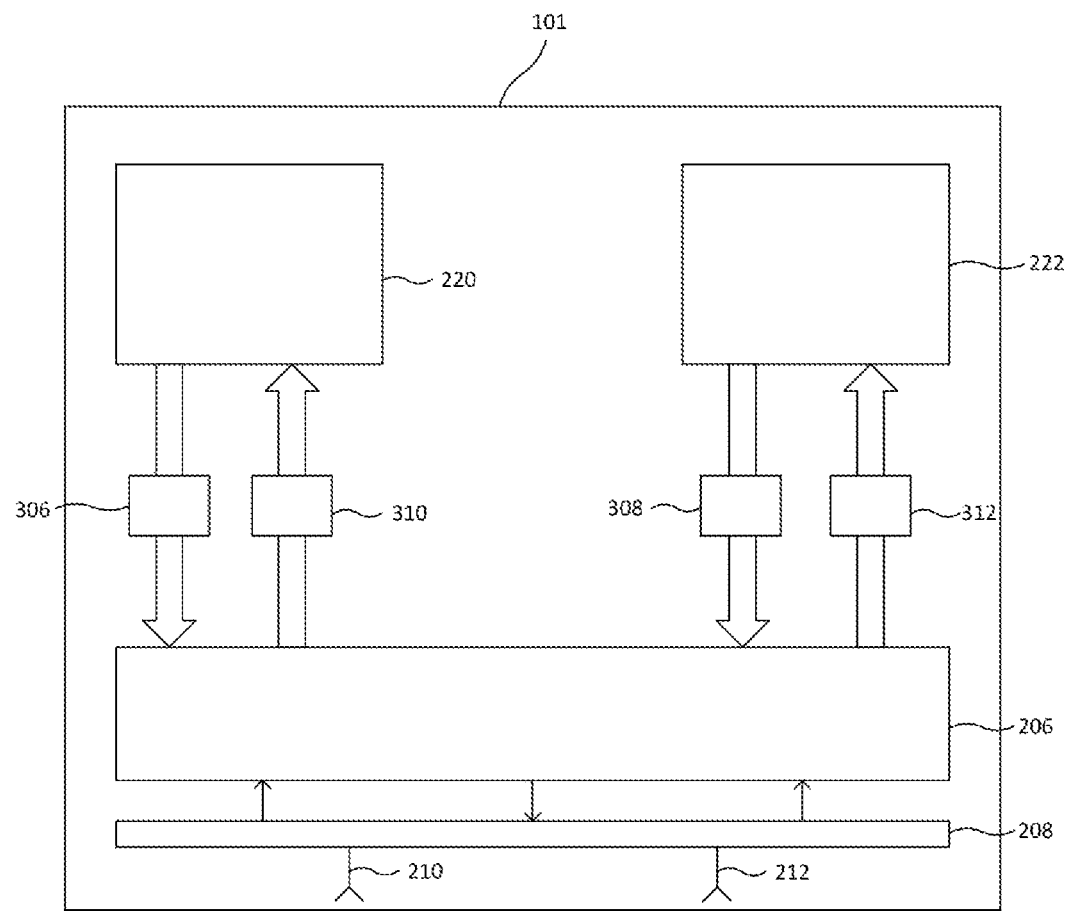
FIG. 3 shows a schematic drawing of the mobile phone, a base station, a first RF (Radio Frequency) connection and a second RF connection between the base station and the mobile phone, respectively.

FIG. 3 shows a schematic drawing of the mobile phone 101, a base station 300 of the base station subsystem 104, a first RF connection 302 and a second RF connection 304 between the base station 300 and the mobile phone 101, respectively. The first RF connection 302 may be an outgoing connection from the mobile phone 101 that involves the transmission of data packets via the first antenna 210. The second RF connection 304 may be an incoming connection to the mobile phone 101 that involves the transmission of data packets via the first antenna 210. By way of example, the receiving of data by the second baseband processing 216 via the second link 221 may trigger the transmission of data associated to the second RF connection 304 from the second baseband processing 216 to the RF processing circuit 206. Further, the receiving of data may trigger the set up of the second RF connection 304 during the ongoing first RF connection 302.

The first baseband processing circuit 220 transmits an uplink first data packet 306 of an uplink connection between the first baseband processing circuit 220 and the base station 300 via the RF processing circuit 206 and the front end module 208 to the first antenna 210. The first antenna 210 may send the first data packet 306 via the first RF connection 302 to the base station 300. Further, the RF processing circuit 206 may transmit one or several data packets 310 that may be associated with the first data packet 306 or the first RF connection 302 to the first baseband processing circuit 220.

Further, the second baseband processing circuit 222 may transmit an uplink second data packet 308 of an uplink connection between the second baseband processing circuit 222 and the base station 300 via the RF processing circuit 206 and the front end module 208 to the first antenna 210. The first antenna 210 may send the second data packet 308 via the first RF connection 302 to the base station 300. Moreover, the RF processing circuit 206 may transmit one or several data packets 312 that may be associated with the second data packet 308 or the second RF connection 304 to the second baseband processing circuit 222.

Figure 4:
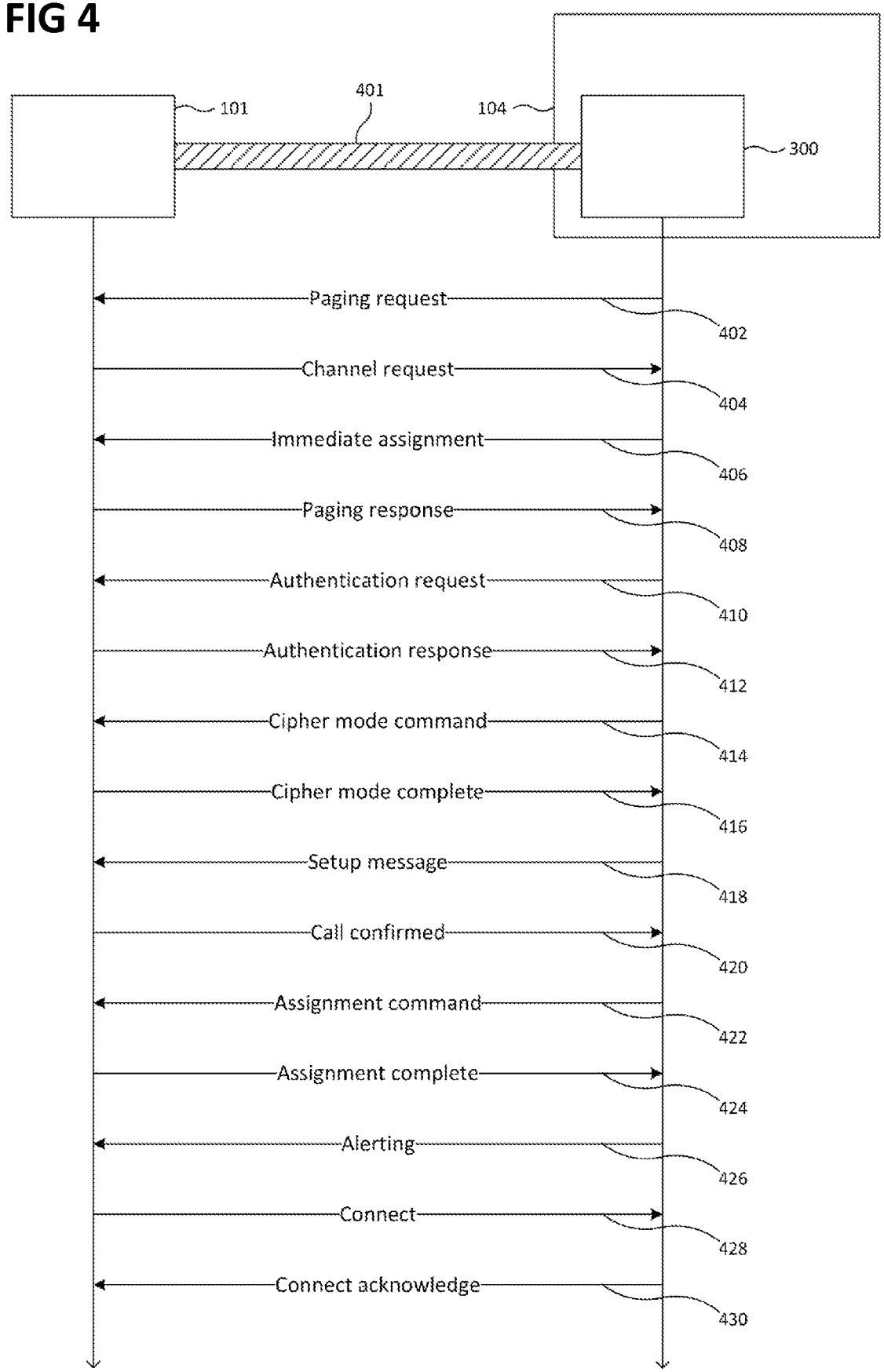
FIG. 4 shows a schematic time flow diagram of messages transmitted over a connection between the mobile phone and the base station.

FIG. 4 shows a schematic time flow diagram of messages transmitted over a connection 401 between the mobile phone 101 and the base station 300 for setting up a communication session initiated by the side of the base station system 104. The connection 401 may include one of the RF connections 302 and 304. The set up communication session may be preceded by various downlink and uplink control messages that may be transmitted via Control Channels (CCH), e.g. the Common Control Channel (CCCH) and the Dedicated Control Channel (DCCH). The Control Channels may include a Paging Channel (PCH), a Random Access Channel (RACH) and an Access Grant Channel (AGCH). The DCCH may includes the Stand-Alone Dedicated Control Channel (SDCCH), the Slow Associated Dedicated Control Channel (SACCH) and the Fast Associated Dedicated Control Channel (FACCH).

The set up control messages for the communication session may involve a paging request message 402 transmitted from the base station 300 to the mobile phone 101 via the Paging Channel. Further, the mobile phone 101 may transmit a channel request message 404 to the base station 300 via the Random Access Channel. Further, the base station 300 may transmit an immediate assignment message 406 to the mobile phone 101 that includes a frequency and a timeslot for a Traffic Channel (TCH) via the AGCH. Further, the mobile phone 101 may transmit a paging response message 408 to the base station 300 including a mobile identity of the mobile phone 101 via the SDCCH. Further, the base station 300 may send an authentication request message 410 to the mobile phone 101 via the SDCCH and may receive an authentication response 412 on the SDCCH that is transmitted from the mobile phone 101 to the base station 300. Further, the base station 300 may transmit a cipher mode command message 414 to the mobile phone 101 and may receive a cipher mode complete message 416 from the mobile phone 101 each via the SDCCH, respectively. The base station may send a setup message 418 to the mobile phone 101 that may contain a caller ID via the SDCCH. Further, the mobile phone 101 may transmit a call confirmed message 420 to the base station 300. The base station may send an assignment command message 422 to the mobile phone 101 and may receive an assignment complete message 424 each via the SDCCH, respectively. The base station 300 may transmit an alerting message 426 to the mobile phone 101 via the SDCCH. Further, the mobile phone 101 may transmit a connect message 428 to the base station 300 via the SDCCH that acknowledges connection between the mobile phone 101 and the base station 300. Further, the base station 300 may transmit a connect acknowledge message 430 to the mobile phone 112 via the SDCCH. After the exchange of the above described messages the call may be established so that data packets that are associated to the transmission of speech are transmitted via the TCH.

Figure 5:
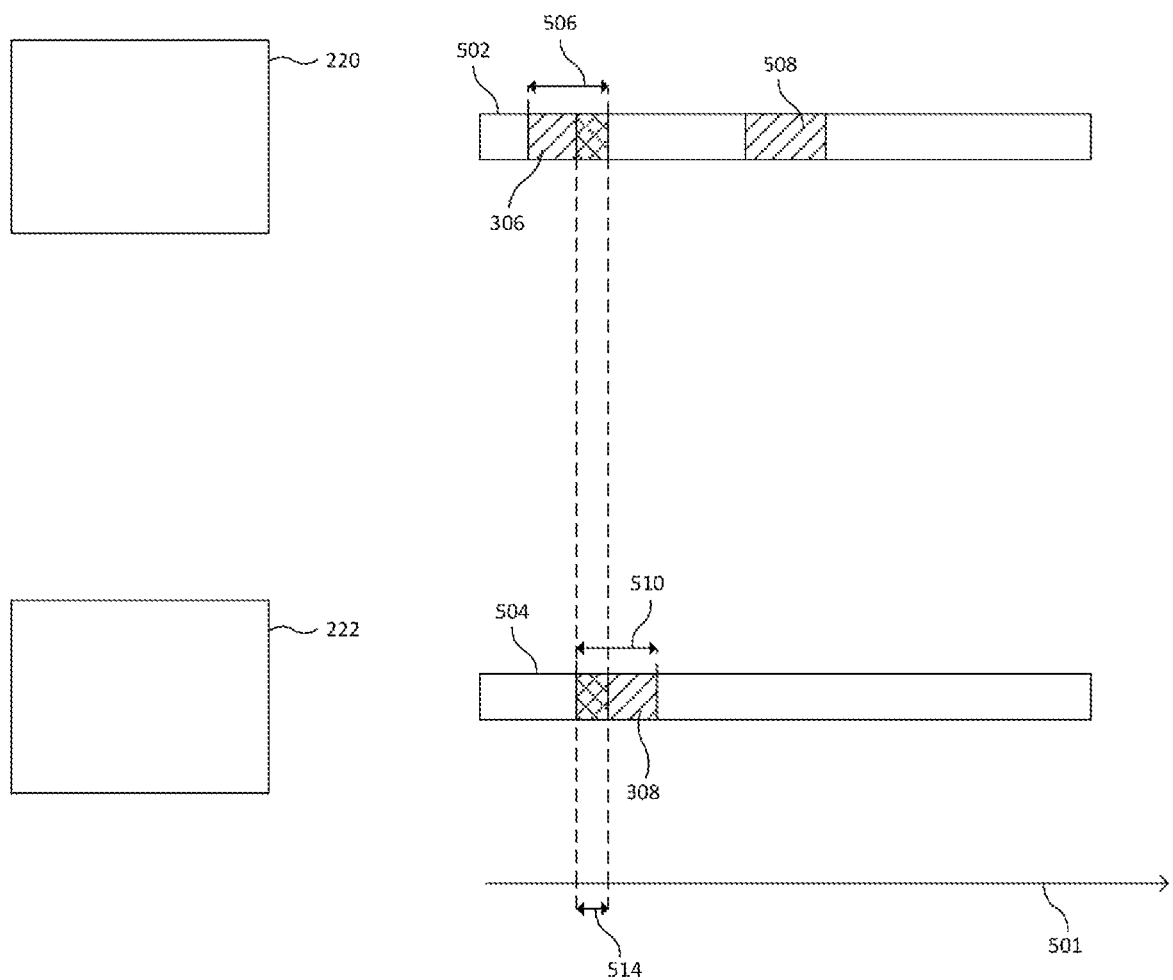
FIG. 5 shows a schematic time flow diagram of communication data that is transmitted between an RF processing circuit and two baseband processing circuits.

FIG. 5 shows a schematic time flow diagram of communication data that is transmitted between the RF processing circuit 206 and the baseband processing circuits 220 and 222. The time flow direction of the time flow diagram is indicated by the arrow 501. The time flow diagram has a first bar 502 and a second bar 504 which show the arrival time of uplink data that is transmitted from the baseband processing circuits 220 and 222 to the RF processing circuit 206, respectively. The data that is transmitted from the first baseband processing circuits 220 to the RF processing circuit 206 may be associated to the setting up of a first call (which may also be referred to as a first communication session) initiated by the mobile phone 101. The first communication session may include similar messages to the messages that are transmitted between the mobile phone 101 and the base station 300 as described for the connection 401. Further, the data that is transmitted from the second baseband processing circuit 222 may be associated to the setting up of a second call (which may also be referred to as a second communication session) initiated by the side of the base station subsystem 104. The second communication session may include the messages that are transmitted between the mobile phone and the base station as described for the connection 401.

The data transmitted from the first baseband processing circuit 220 includes the first data packet 306 that arrives at the RF processing circuit 220 in a first arrival time interval 506 and a second data packet 508. Further, the data transmitted from the second baseband processing circuit 222 includes the second data packet 308 that arrives at the RF processing circuit 206 in a second arrival time interval 510. The second arrival time interval 510 may overlap with the first arrival time interval 506 so that in a first overlap interval 514 data of the first data packet 306 and data of the second data packet 308 arrive at the RF processing circuit 206 at the same time.

Data packets having at least a partially common (in other words at least partially overlapping) arrival time at the RF processing circuit 206 may also be referred to as having a transmission collision or receiving collision. By way of example, the channels FACCH, SDCCH and SACCH may have equal priority so that data transmitted over these channels from the baseband processing circuits may have transmission collisions. In an example, data packets transmitted from the first baseband processing circuit 220 over the SDCCH may have a transmission collision with other data packets transmitted over the SDCCH or FACCH. Further, data packets transmitted from the first baseband processing circuit 220 over the SACCH may have a transmission collision with other data packets transmitted over the SACCH.

Figure 6:
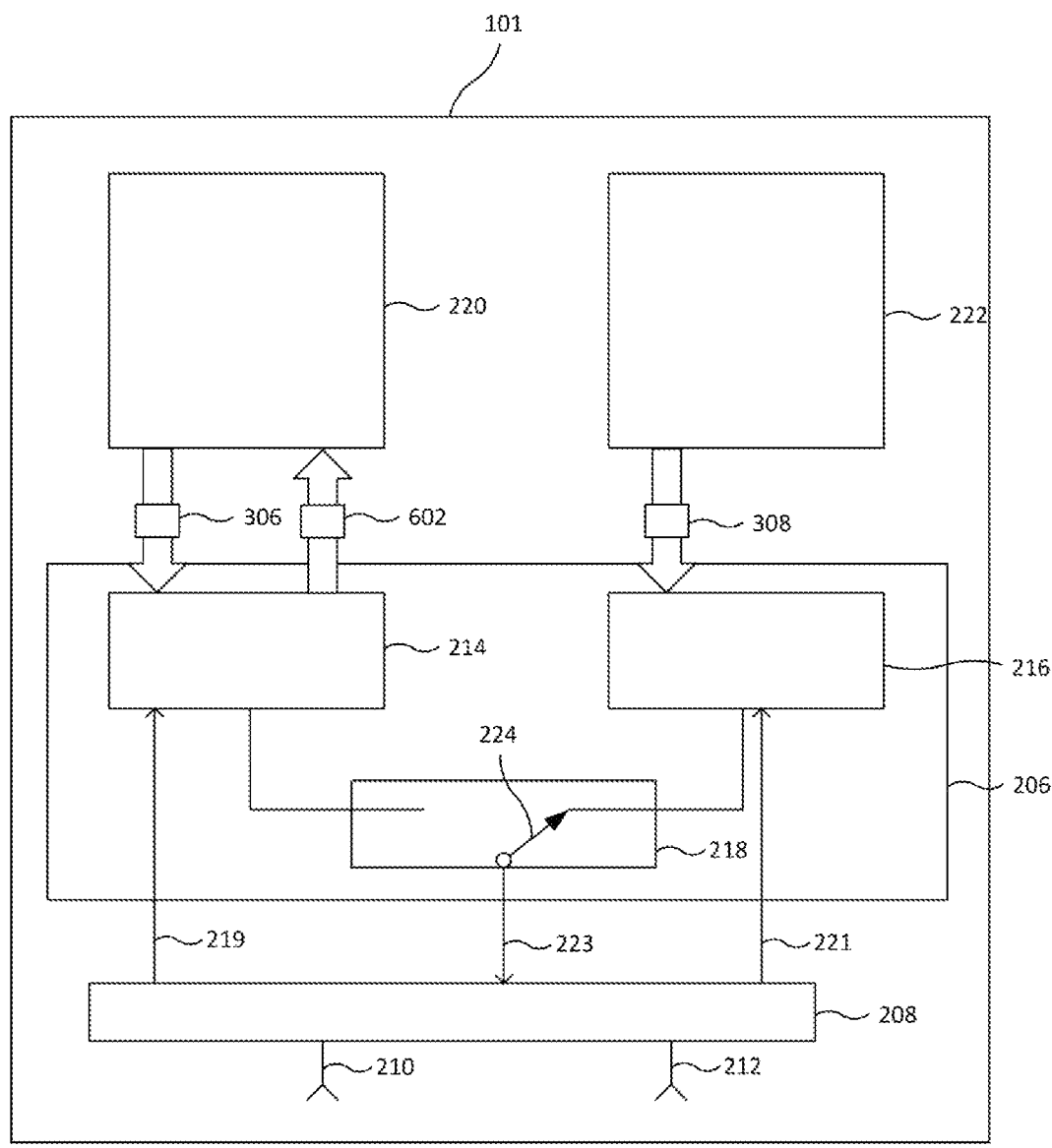
FIG. 6 shows a schematic drawing depicting the transmission of data packets to the RF processing circuit.

FIG. 6 shows a schematic drawing depicting the transmission of the data packets 306 and 308 to the RF processing circuit 206. The RF processing circuit 206 may either transmit the first data packet 306 and abort the transmission of the second data packet 308 or transmit the second data packet 308 and abort the transmission of the first data packet 306. In the following, it will be assumed that the second baseband processing circuit 222 has successfully transmitted the second data packet 308 to the RF processing circuit 206 and the transmission of the first data packet 306 has been aborted. The second data packet 308 may be transmitted further to the front end module 208 for transmission via the RF connection 304.

Further, the RF processing circuit 206 may transmit a third data packet 602 that includes a first collision information to the first baseband processing circuit 220. Instead of the third data packet 602, a plurality of data packets may be transmitted that include the first collision information. The first collision information includes information about the abortion of the transmission of the first data packet 306.

Figure 7:
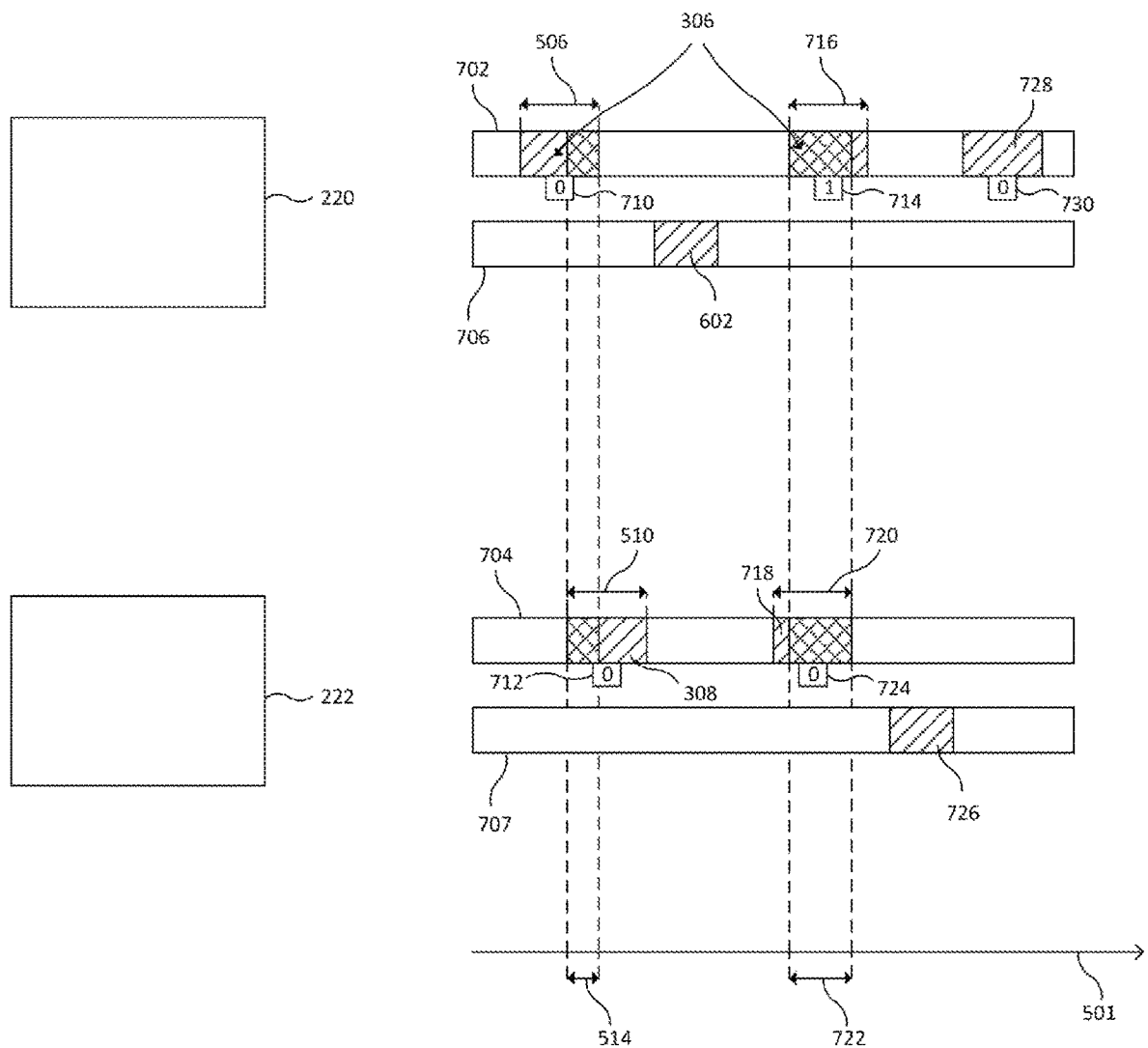
FIG. 7 shows a time flow diagram for communication data between the baseband processing circuits and the RF processing circuit.

FIG. 7 shows a time flow diagram that depicts the arrival time of data transmitted from the first baseband processing circuit 220 and the second baseband processing circuit 222 to the RF processing circuit 206 in a first bar 702 and a second bar 704, respectively. Further, the time flow diagram shows the sending time of data transmitted from the RF processing circuit 206 to the first baseband processing circuit 220 and the second baseband processing circuit 222 in a third bar 706 and in a fourth bar 707, respectively. The first bar 702 and the second bar 704 correspond to the bars indicated in FIG. 5 and show the overlapping arrival time intervals 506 and 510 of the first data packet 306 and the second data packet 308, respectively.

Further, each uplink data packet that is transmitted from the first baseband processing circuit 220 and the second baseband processing circuit 222 to the RF processing circuit 206 may be associated with a priority tag including priority information. By way of example, the first data packet 306 and the second data packet 308 may be associated with a first priority tag 710 and a second priority tag 712, respectively. The first priority tag 710 and the second priority tag 712 may indicate a first priority symbolized by "0", respectively.

As can be seen in the third bar 706 of FIG. 7, the RF processing circuit 206 may transmit the third data packet 602 containing the first collision information after the transmission of the first data packet 306 is aborted. Further, the first baseband processing circuit 220 may assign a third priority tag 714 to the first data packet 306 indicating a second priority symbolized by "1" that is higher than the first priority and may re-transmit the first data packet 306 together with the third priority tag 714. The re-transmitted first data packet 306 may arrive at the RF processing circuit 206 in a third arrival time interval 716.

Further, an uplink fourth data packet 718 with an associated fourth priority tag 724 may arrive at the RF processing circuit 206 in a fourth arrival time interval 720. The arrival time intervals 716 and 720 may have a common second overlap interval 722 so that the data packets 306 and 718 collide. The third priority tag 714 of the first data packet 306 may indicate a higher priority than the fourth priority tag 724 so that the RF processing circuit 206 may select the first data packet 306 for transmission and may abort the transmission of the fourth data packet 718. The RF processing circuit 206 may transmit a fifth data packet 726 to the second baseband processing circuit 222 that includes a second collision information. The second collision information may include information about the abortion of the transmission of the fourth data packet 718.

Further, the first baseband processing circuit 220 may transmit an uplink sixth data packet 728 with an associated fifth priority tag 730 indicating the first priority to the RF processing circuit 206. The sixth data packet 728 may be the data packet that is scheduled as next in line for transmission to the RF processing circuit 206 after the transmission of the first data packet 306. In the first example, each data packet 306, 308, 718 and 728 that the baseband processing circuits 220, 222 transmit by default may have the first priority as an associated priority tag 710, 712, 724, 730. The baseband processing circuits 220, 222 may re-transmit the data packet that is indicated in the collision information together with the associated third priority tag 714 only if the received collision information 602, 726 includes information about the abortion of transmission of the indicated data packet.

Figure 8:
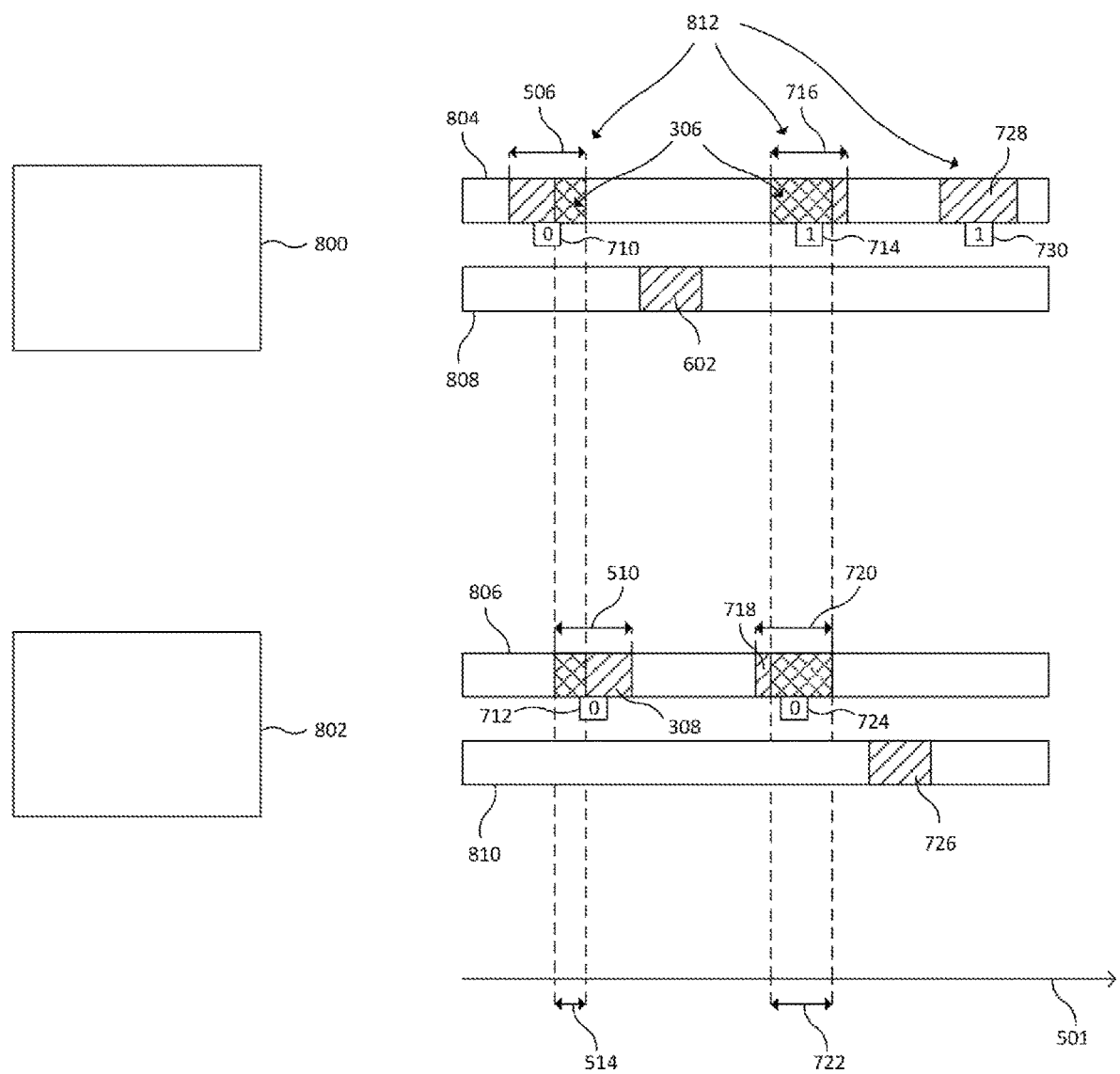
FIG. 8 shows a time flow diagram for communication data of a second mobile phone according to a second example.

FIG. 8 shows a time flow diagram for communication data of a second mobile phone according to a second example. In this case, the mobile phone may have a third baseband processing circuit 800, a fourth baseband processing circuit 802 and a second RF processing circuit that may transmit data to and receive data from the baseband processing circuits 800 and 802. The communication data shown in the time flow diagram includes the data transmitted between the baseband processing circuits 800, 802 and the second RF processing circuit. The time flow diagram has a first bar 804 and a second bar 806 that show the arrival time of data transmitted from the baseband processing circuits 800 and 802 to the second RF processing circuit, respectively. Further, the time flow diagram has a third bar 808 and a fourth bar 810 that show the sending time of data transmitted from second RF processing circuit to the baseband processing circuits 800 and 802, respectively. Devices and data of the second example with essentially the same composition and function as in the first example are referred to by the same reference numerals.

In the second example, the third baseband processing circuit 800 may group the data packets into frames in such a way that the data packets of a first frame 812 are transmitted before the data packets of a second frame. The first frame 812 may include the data packets 306 and 728. The third baseband processing circuit 800 may re-transmit the first data packet 306 with the associated third priority tag 714 as described in case of the first baseband processing circuit 220 in the description to FIG. 7. In contrast to the first example the third baseband processing circuit 800 may transmit the sixth data packet 728 with an associated fourth priority tag indicating the higher second priority. Further, the third baseband processing circuit 800 may transmit all data packets of the first frame 812 that have not yet been transmitted with an associated priority tag indicating the higher second priority. Moreover, the third baseband processing circuit 800 may transmit at least the data packet of the second frame that is transmitted after the transmission of the last data packet of the first frame with an associated priority tag indicating the first priority. All other features of the mobile phone according to the second example are provided corresponding to those of the first example.

Figure 9:
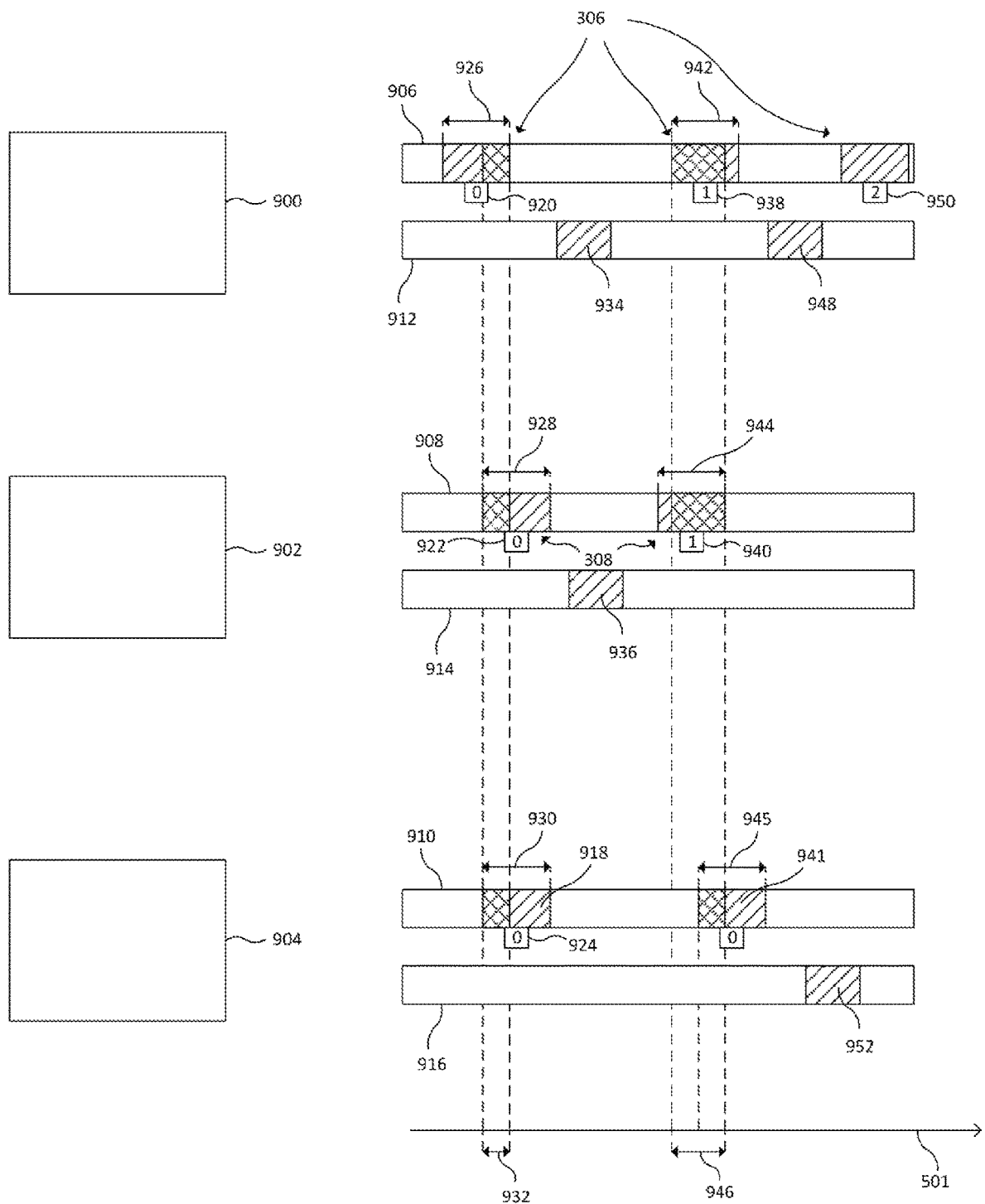
FIG. 9 shows a time flow diagram for communication data of a third mobile phone according to a third example.

FIG. 9 shows a time flow diagram for communication data of a third mobile phone according to a third example. The third mobile phone may have a fifth baseband processing circuit 900, a sixth baseband processing circuit 902, a seventh baseband processing circuit 904 and a third RF processing circuit that may transmit data to and may receive data from the baseband processing circuits 900, 902 and 904. The data communicated between the baseband processing circuits 900, 902 and the third RF processing circuit is displayed in the time flow diagram of FIG. 9. The time flow diagram has six bars from which a first bar 906, a second bar 908 and third bar 910 show the arrival time of data transmitted from the baseband processing circuits 900, 902 and 904 to the third RF processing circuit, respectively, and from which a fourth bar 912, a fifth bar 914 and a sixth bar 916 show the sending time of data transmitted from the third RF processing circuit to the baseband processing circuits 900, 902 and 904, respectively.

As shown in the first bar 906, the second bar 908 and the third bar 910 the baseband processing circuits 900, 902 and 904 may transmit the data packets 306, 308 and a seventh data packet 918 to the third RF processing circuit, respectively. The data packets 306, 308 and 918 may have an associated fifth priority tag 920, an associated sixth priority tag 922 and an associated seventh priority tag 924 indicating the first priority, respectively. Further, the data packets 306, 308 and 918 may arrive in a fifth arrival time interval 926, a sixth arrival time interval 928 and a seventh arrival time interval 930 at the third RF processing circuit, respectively. The arrival time intervals 926, 928 and 930 may have a common third overlap interval 932 so that there is a transmission collision of the data packets 306, 308 and 918 at the third RF processing circuit. The third RF processing circuit may accept the seventh data packet 918 for transmission and may abort the transmission of the data packets 306 and 308. Further, the third RF processing circuit may transmit an eighth data packet 934 with a third collision information to the fifth baseband processing circuit 900 and a ninth data packet 936 with a fourth collision information to the sixth baseband processing circuit 902, respectively. The third and fourth collision information may include information about the abortion of the transmission of the data packets 306 and 308, respectively. The fifth baseband processing circuit 900 may re-transmit the first data packet 306 with an associated eighth priority tag 938, the sixth baseband processing circuit 902 may re-transmit the second data packet 308 with an associated ninth priority tag 940 that may indicate the second priority, respectively, and the seventh baseband processing circuit 904 may transmit a tenth data packet 941 to the third RF processing circuit. The re-transmitted data packets 306 and 308 may arrive in an eighth arrival time interval 942 and a ninth arrival time interval 944, respectively, and the tenth data packet 941 may arrive in a tenth arrival time interval 945. The arrival time intervals 942 and 944 may have a common fourth overlap interval 946 so that there may be a transmission collision of the re-transmitted data packets 306 and 308 at the third RF processing circuit. The third RF processing circuit may select randomly or by other criteria associated to the data packets the second data packet 308 for transmission and may abort the transmission of the first data packet 306. Further, the tenth arrival time interval 945 may overlap with the arrival time intervals 942 and 944 so that due to the higher priority of the priority tag 938 and 940 the third RF processing circuit aborts the transmission of the tenth data packet 941.

Further, the third RF processing circuit may transmit an eleventh data packet 948 to the fifth baseband processing circuit 900 and a twelfth data packet 952 to the seventh baseband processing circuit 904. The eleventh data packet 948 may include collision information indicating the abortion of re-transmission of the first data packet 306 and the twelfth data packet 952 may include collision information indicating the abortion of transmission of the tenth data packet 941. Further, the fifth baseband processing circuit 900 may re-transmit the first data packet 306 with an associated tenth priority tag 950 indicating a third priority that is higher than the second priority. The third priority is symbolized by "2". All other features of the mobile phone according to the third example are provided corresponding to those of the first example.

Figure 10:
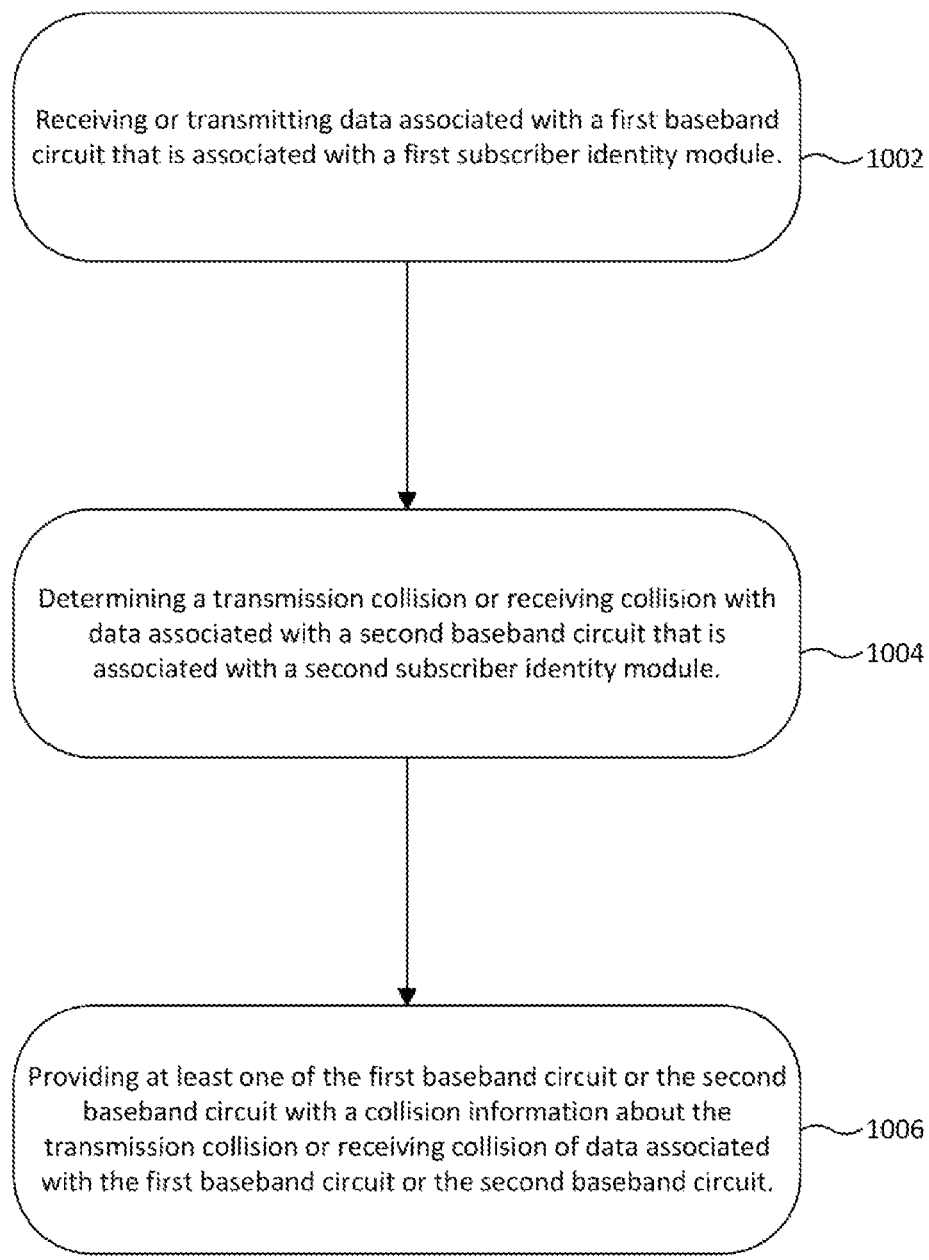
FIG. 10 shows a flow diagram that illustrates a method for performing radio communication.

FIG. 10 shows a flow diagram that illustrates a method for performing radio communication that involves a transmission collision of data associated to a first baseband circuit and a second baseband circuit.

The method may include, in 1002, associating data with the first baseband circuit that is associated with the first subscriber identity module is received or transmitted.

The method may further include, in 1004, determining a transmission collision or receiving collision with data associated with the second baseband circuit. The second baseband circuit is associated with a second subscriber identity module.

The method may further include, in 1006, providing at least one of the first baseband circuit or the second baseband circuit with a collision information about the transmission collision or receiving collision of data associated with the first baseband circuit or the second baseband circuit.

Figure 11:
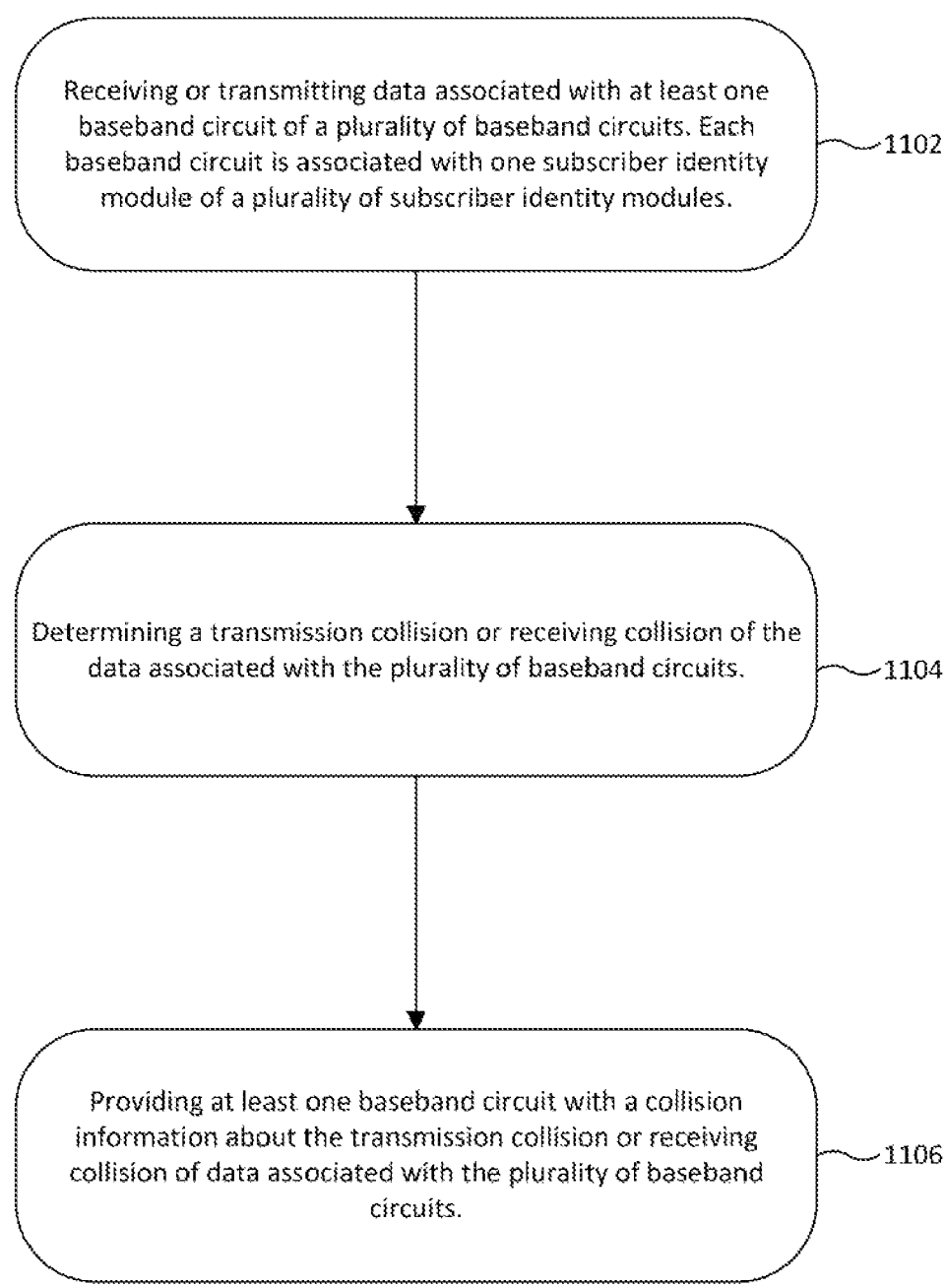
FIG. 11 shows another flow diagram that illustrates a method for performing radio communication.

FIG. 11 shows flow diagram that illustrates a method for performing radio communication that involves a plurality of baseband circuits.

The method may include, in 1102, associating data with at least one baseband circuit of the plurality of baseband circuits is received or transmitted. Each baseband circuit is associated with one subscriber identity module of the plurality of subscriber identity modules.

The method may further include, in 1104, determining a transmission collision or receiving collision of the data associated with the plurality of baseband circuits.

The method may further include, in 1106, providing at least one baseband circuit with a collision information about the transmission collision or receiving collision of data associated with the plurality of baseband circuits.

It should be noted that aspects described in the context of the mobile phones according to the examples one to three are analogously valid for the methods illustrated in FIG. 10 and FIG. 11.

In the following, various aspects of this disclosure will be illustrated:

Example 1 is a communication device. The communication device may include a first subscriber identity module, a second subscriber identity module, a first baseband circuit associated with the first subscriber identity module, a second baseband circuit associated with the second subscriber identity module, and a radio frequency circuit coupled to the first baseband circuit and the second baseband circuit. The radio frequency circuit is configured to provide at least one of the first baseband circuit or the second baseband circuit with a collision information about a transmission collision or receiving collision of data associated with the first baseband circuit or the second baseband circuit.

In Example 2, the subject matter of Example 1 can optionally include that the collision information includes information about aborted transmission of data associated with the first baseband circuit due to a collision with data associated with the second baseband circuit.

In Example 3, the subject matter of any one of Examples 1 or 2 can optionally include that a first priority information is assigned to the data associated with the first baseband circuit. A second priority information may be assigned to the data associated with the second baseband circuit. The radio frequency circuit may be configured to select the data for transmission in accordance with a predefined scheduling scheme taking into consideration at least one of the first priority information or the second priority information.

In Example 4, the subject matter of Example 3 can optionally include that the radio frequency circuit is configured to select the data for transmission which is assigned priority information indicating the higher priority.

In Example 5, the subject matter of any one of Examples 1 to 4 can optionally include that the first subscriber identity module includes a first subscriber identity module card. The second subscriber identity module may include a second subscriber identity module card.

In Example 6, the subject matter of any one of Examples 1 to 5 can optionally include that at least one of the first baseband circuit or the second baseband circuit is configured to re-schedule the transmission of the data based on the collision information if the transmission of the data of at least one of the first baseband circuit or the second baseband circuit to the radio frequency circuit is aborted.

In Example 7, the subject matter of Example 6 can optionally include that at least one of the first baseband circuit or the second baseband circuit is configured to change the priority information assigned to the data for the re-scheduled transmission of the data to increase the transmission priority of the data.

In Example 8, the subject matter of Example 7 can optionally include that at least one of the first baseband circuit or the second baseband circuit is configured to temporarily change the priority information assigned to the data for the re-scheduled transmission of the data as valid for at least one transport block.

In Example 9, the subject matter of any one of Examples 1 to 8 can optionally include that the first baseband circuit, the second baseband circuit, and the radio frequency circuit are configured in accordance with a 2G mobile radio communication technology.

In Example 10, the subject matter of Example 9 can optionally include that the first baseband circuit, the second baseband circuit, and the radio frequency circuit are configured in accordance with Global System for Mobile communications (GSM) technology.

In Example 11, the subject matter of any one of Examples 1 to 10 can optionally include that at least one of the first baseband circuit or the second baseband circuit is configured to request the collision information from the radio frequency circuit.

In Example 12, the subject matter of any one of Examples 1 to 11 can optionally include that the radio frequency circuit includes a single antenna.

Example 13 is a communication device. The communication device may include a plurality of subscriber identity modules a plurality of baseband circuits, each of the plurality of baseband circuits being associated with a subscriber identity module of the plurality of subscriber identity modules, and at least one radio frequency circuit. The number of radio frequency circuits is less than the number of subscriber identity modules, the at least one radio frequency circuit being coupled to at least one baseband circuit of the plurality of baseband circuits. The at least one radio frequency circuit is configured to generate a collision information about a transmission collision of data associated with the plurality of baseband circuits and to transmit the collision information to the at least one baseband circuit of the plurality of baseband circuits.

In Example 14, the subject matter of Example 13 can optionally include that the collision information includes information about aborted transmission of data associated with one baseband circuit of the plurality of baseband circuits due to a collision with data associated with another baseband circuit of the plurality of baseband circuits.

In Example 15, the subject matter of any one of Examples 13 or 14 can optionally include that a priority information is assigned to the data associated with each baseband circuit. The radio frequency circuit may be configured to select the data for transmission according to a predefined scheduling scheme based on at least the priority information.

In Example 16, the subject matter of Example 15 can optionally include that the radio frequency circuit is configured to select the data for transmission which is assigned priority information indicating the highest priority.

In Example 17, the subject matter of any one of Examples 13 to 16 can optionally include that each of the plurality of subscriber identity modules comprises a respective subscriber identity module card.

In Example 18, the subject matter of any one of Examples 13 to 17 can optionally include that the at least one baseband circuit of the plurality of baseband circuits is configured to re-schedule the transmission of the data based on the collision information if the transmission of the data of the at least one baseband circuit of the plurality of baseband circuits to the radio frequency circuit is aborted.

In Example 19, the subject matter of Example 18 can optionally include that the at least one baseband circuit of the plurality of baseband circuits is configured to change the priority information assigned to the data for the re-scheduled transmission of the data to increase the transmission priority of the data.

In Example 20, the subject matter of Example 19 can optionally include that the at least one baseband circuit of the plurality of baseband circuits is configured to temporarily change the priority information assigned to the data for the re-scheduled transmission of the data as valid for at least one transport block.

In Example 21, the subject matter of any one of Examples 13 to 20 can optionally include that the plurality of baseband circuits and the at least one radio frequency circuit are configured in accordance with a 2G mobile radio communication technology.

In Example 22, the subject matter of Example 21 can optionally include that the plurality of baseband circuits and the at least one radio frequency circuit are configured in accordance with Global System for Mobile communications (GSM) technology.

In Example 23, the subject matter of any one of Examples 13 to 22 can optionally include that the at least one of the baseband circuits is configured to request the collision information from the radio frequency circuit.

In Example 24, the subject matter of any one of Examples 13 to 23 can optionally include that the at least one radio frequency circuit includes a single antenna.

In Example 25, the subject matter of any one of Examples 13 to 24 can optionally include that the collision information includes a time window information. The at least one baseband circuit of the plurality of baseband circuits may be configured to re-schedule the transmission of the data within a time window indicated by the time window information.

Example 26 is a method for performing radio communication. The method may include receiving or transmitting a first data associated with a first baseband circuit, wherein the first baseband circuit is associated with a first subscriber identity module, and if a transmission collision or receiving collision occurs between the first data and a second data associated with a second baseband circuit that is associated with a second subscriber identity module sending at least one of the first baseband circuit or the second baseband circuit a collision information about the transmission collision or receiving collision of data associated with the first baseband circuit or the second baseband circuit.

In Example 27, the subject matter of Example 26 can optionally include that a radio frequency circuit is coupled to the first baseband circuit and the second baseband circuit. The method may further include transmitting the first data to the radio frequency circuit, and transmitting the second data to the radio frequency circuit.

In Example 28, the subject matter of any one of Examples 26 or 27 can optionally include that the collision information includes information about aborted transmission of the first data due to a collision with the second data.

In Example 29, the subject matter of any one of Examples 26 to 28 can optionally include that the method further includes assigning a first priority information to the first data and assigning a second priority information to the second data. The method may further include selecting the data for transmission according to a predefined scheduling scheme based at least on one of the first priority information or the second priority information.

In Example 30, the subject matter of Example 29 can optionally include that the method further includes selecting the data for transmission which is assigned priority information indicating the higher priority.

In Example 31, the subject matter of any one of Examples 26 to 30 can optionally include that the first subscriber identity module includes a first subscriber identity module card. The second subscriber identity module may include a second subscriber identity module card.

In Example 32, the subject matter of any one of Examples 26 to 30 can optionally include that the method further includes re-scheduling the transmission of the data based on the collision information if the transmission of the data of at least one of the first baseband circuit or the second baseband circuit to the radio frequency circuit is aborted.

In Example 33, the subject matter of Example 32 can optionally include that the method further includes changing the priority information assigned to the data for the re-scheduled transmission of the data to increase the transmission priority of the data.

In Example 34, the subject matter of Example 33 can optionally include that the method further includes temporarily changing the priority information assigned to the data for the re-scheduled transmission of the data as valid for at least one transport block.

In Example 35, the subject matter of any one of Examples 27 to 34 can optionally include that the first baseband circuit, the second baseband circuit, and the radio frequency circuit are configured in accordance with a 2G mobile radio communication technology.

In Example 36, the subject matter of Example 35 can optionally include that the first baseband circuit, the second baseband circuit, and the radio frequency circuit are configured in accordance with Global System for Mobile communications (GSM) technology.

In Example 37, the subject matter of any one of Examples 27 to 36 can optionally include that the method further includes requesting the collision information from the radio frequency circuit by at least one of the first baseband circuit or the second baseband circuit.

In Example 38, the subject matter of any one of Examples 27 to 37 can optionally include that the radio frequency circuit includes a single antenna.

Example 39 is a method for performing radio communication. The method may include receiving or transmitting a first data associated with at least one baseband circuit of a plurality of baseband circuits. Each baseband circuit of the plurality of baseband circuits is associated with a subscriber identity module of a plurality of subscriber identity modules. The method may further include, if a transmission collision or receiving collision of the first data with a second data associated with the plurality of baseband circuits is determined providing the at least one baseband circuit with a collision information about the transmission collision or receiving collision of the first data.

In Example 40, the subject matter of Example 39 can optionally include that at least one radio frequency circuit is coupled to the at least one baseband circuit. The method may further include transmitting the first data to the at least one radio frequency circuit, and transmitting the second data to the at least one radio frequency circuit.

In Example 41, the subject matter of any one of Examples 39 or 40 can optionally include that the second data is associated with another baseband circuit of the plurality of baseband circuits, and the collision information comprises information about aborted transmission of the first data due to a collision with the second data.

In Example 42, the subject matter of any one of Examples 39 to 41 can optionally include that the method further includes assigning a priority information to the data associated with each baseband circuit, and selecting the data for transmission according to a predefined scheduling scheme based on the priority information.

In Example 43, the subject matter of Example 42 can optionally include that the method further includes selecting the data for transmission which is assigned priority information indicating the highest priority.

In Example 44, the subject matter of any one of Examples 39 to 43 can optionally include that each subscriber identity module of the plurality of subscriber identity modules includes a respective subscriber identity module card.

In Example 45, the subject matter of any one of Examples 39 to 44 can optionally include that the method further includes re-scheduling the transmission of the first data based on the collision information if the transmission of the first data to the radio frequency circuit is aborted.

In Example 46, the subject matter of Example 45 can optionally include that the method further includes changing the priority information assigned to the data for the re-scheduled transmission to increase the transmission priority of the data.

In Example 47, the subject matter of Example 46 can optionally include that the method further includes temporarily changing the priority information assigned to the data for the re-scheduled transmission of the data as valid for at least one transport block.

In Example 48, the subject matter of any one of Examples 40 to 47 can optionally include that the plurality of baseband circuits and the at least one radio frequency circuit are configured in accordance with a 2G mobile radio communication technology.

In Example 49, the subject matter of Example 48 can optionally include that the plurality of baseband circuits and the at least one radio frequency circuit are configured in accordance with Global System for Mobile communications (GSM) technology.

In Example 50, the subject matter of any one of Examples 40 to 49 can optionally include that the method further includes requesting the collision information from the radio frequency circuit by the at least one of the baseband circuits.

In Example 51, the subject matter of any one of Examples 40 to 50 can optionally include that the at least one radio frequency circuit includes a single antenna.

In Example 52, the subject matter of any one of Examples 40 to 51 can optionally include that the collision information includes a time window information. The method may further include re-scheduling the transmission of the first data from the at least one of the baseband circuits to the radio frequency circuit within a time window indicated by the time window information.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile phone communication device, comprising:
   a first subscriber identity module;
   a second subscriber identity module;
   a first baseband circuit configured to transmit data packets associated with the first subscriber identity module;
   a second baseband circuit configured to transmit data packets associated with the second subscriber identity module;
   a radio frequency circuit coupled to the first baseband circuit and the second baseband circuit;
   wherein the radio frequency circuit is configured to provide said at least one of the first baseband circuit or the second baseband circuit with a collision information about a transmission collision of the data packets or receiving collision of data packets associated with the first baseband circuit or the second baseband circuit;
   wherein said at least one of the first baseband circuit or the second baseband circuit is configured to re-schedule a transmission of the data packets based on the collision information, wherein the collision information indicates that the transmission of the data packets of said at least one of the first baseband circuit or the second baseband circuit to the radio frequency circuit was aborted;
   wherein the aborted data packets of the first baseband circuit or the second baseband circuit are re-scheduled to be transmitted in response to a first collision.

2. The mobile phone communication device of claim 1, wherein a first priority information is assigned to the data packets associated with the first baseband circuit;
   wherein a second priority information is assigned to the data packets associated with the second baseband circuit;
   wherein the radio frequency circuit is configured to select the data packets for transmission according to a predefined scheduling scheme based on at least one of the first priority information or the second priority information.

3. The mobile phone communication device of claim 2, wherein said at least one of the first baseband circuit or the second baseband circuit is configured to change the priority information assigned to the data packets for the re-scheduled transmission of the data packets to increase the transmission priority of the data packets.

4. The mobile phone communication device of claim 1, further comprising a switching circuit configured to enable transmission of data packets from either the first baseband circuit or the second baseband circuit based on the collision information; and wherein the switching circuit is further configured to abort the transmission of data packets from the non-enabled baseband circuit.

5. The mobile phone communication device of claim 1, wherein the transmission collision is one or more data packets associated with the first baseband circuit which are scheduled for contemporaneous transmission with one or more data packets associated with the second baseband circuit.

6. The mobile phone communication device of claim 1, wherein the data packets are associated with a priority tag indicating transmission priority.

7. The mobile phone communication device of claim 1, wherein the data packets of the first baseband circuit and the second baseband circuit are re-scheduled to be transmitted alternately after the first collision.

8. A mobile phone communication device, comprising:
   a plurality of subscriber identity modules;
   a plurality of baseband circuits, each of the plurality of baseband circuits configured to transmit data packets and each of the plurality of baseband circuits being associated with a respective subscriber identity module of the plurality of subscriber identity modules;
   at least one radio frequency circuit, wherein the number of the radio frequency circuits is less than the number of the subscriber identity modules, the at least one radio frequency circuit being coupled to at least one baseband circuit of the plurality of baseband circuits, wherein the at least one baseband circuit include a first baseband circuit and a second baseband circuit;
   wherein the at least one radio frequency circuit is configured to generate a collision information about a transmission collision of the data packets associated with the plurality of baseband circuits and to transmit the collision information to the at least one baseband circuit of the plurality of baseband circuits;
   wherein at least one of the first baseband circuit or the second baseband circuit is configured to re-schedule a transmission of the data packets based on the collision information, wherein the collision information indicates that the transmission of the data packets of at least one of the first baseband circuit or the second baseband circuit to the radio frequency circuit was aborted;
   wherein the aborted data packets of the first baseband circuit or the second baseband circuit are re-scheduled to be transmitted in response to a first collision.

9. The mobile phone communication device of claim 8, wherein the collision information comprises information about aborted transmission of data packets associated with one baseband circuit of the plurality of baseband circuits due to a collision with data packets associated with another baseband circuit of the plurality of baseband circuits.

10. The mobile phone communication device of claim 8, wherein a priority information is assigned to the data packets associated with each baseband circuit;

wherein the radio frequency circuit is configured to select the data packets for transmission according to a predefined scheduling scheme based on at least the priority information.

11. The mobile phone communication device of claim 10, wherein the radio frequency circuit is configured to select the data packets for transmission which are assigned priority information indicating the highest priority.

12. The mobile phone communication device of claim 10, wherein the at least one baseband circuit of the plurality of baseband circuits is configured to change the priority information assigned to the data packets for the re-scheduled transmission of the data packets to increase the transmission priority of the data packets.

13. The mobile phone communication device of claim 12, wherein the at least one baseband circuit of the plurality of baseband circuits is configured to temporarily change the priority information assigned to the data packets for the re-scheduled transmission of the data packets as valid for at least one transport block.

14. A method for performing radio communications, the method comprising:
receiving or transmitting one or more first data packets associated with a first baseband circuit, wherein the first baseband circuit is associated with a first subscriber identity module;
if a transmission collision of data packets or receiving collision of data packets occurs between the one or more first data packets and one or more second data packets associated with a second baseband circuit that is associated with a second subscriber identity module, sending at least one of the first baseband circuit or the second baseband circuit a collision information about the transmission collision of the data packets or receiving collision of data packets associated with the first baseband circuit or the second baseband circuit; and
re-scheduling the transmission of the data packets based on the collision information, wherein the collision information indicates that the transmission of the data packets of at least one of the first baseband circuit or the second baseband circuit to the radio frequency circuit was aborted;
wherein the aborted data packets of the first baseband circuit or the second baseband circuit are re-scheduled to be transmitted in response to a first collision;
wherein the first baseband circuit and the second baseband circuit operate according to the same radio communication technology.

15. The method of claim 14, wherein a radio frequency circuit is coupled to the first baseband circuit and the second baseband circuit, wherein the method further comprises:
transmitting the one or more first data packets to the radio frequency circuit, and
transmitting the one or more second data packets to the radio frequency circuit.

16. The method of claim 15, further comprising:
assigning a first priority information to the one or more first data packets;
assigning a second priority information to the one or more second data packets;
selecting the data for transmission according to a predefined scheduling scheme based at least on one of the first priority information or the second priority information.

17. The method of claim 16, further comprising:
selecting the data packets for transmission which are assigned priority information indicating the higher priority.

18. The method of claim 17, further comprising:
changing the priority information assigned to the data packets for the re-scheduled transmission of the data packets to increase the transmission priority of the data packets.

19. A method for performing radio communications, the method comprising:
receiving or transmitting one or more first data packets associated with at least one baseband circuit of a plurality of baseband circuits, wherein each baseband circuit of the plurality of baseband circuits is associated with a respective subscriber identity module of a plurality of subscriber identity modules;
when a transmission collision of data packets or receiving collision of data packets of the one or more first data packets with one or more second data packets associated with the plurality of baseband circuits is determined, providing the at least one baseband circuit with a collision information about the transmission collision of the data packets or receiving collision of the one or more first data packets; and
re-scheduling the transmission of the data packets based on the collision information, wherein the collision information indicates that the transmission of the one or more first data packets to the radio frequency circuit being aborted;
wherein the aborted one or more first data packets are re-scheduled to be transmitted in response to a first collision.

20. The method of claim 19, wherein at least one radio frequency circuit is coupled to the at least one baseband circuit, and wherein the method further comprises:
transmitting the one or more first data packets to the at least one radio frequency circuit, and
transmitting the one or more second data packets to the at least one radio frequency circuit.

21. The method of claim 20, further comprising:
assigning a priority information to the data packets associated with each baseband circuit of the plurality of baseband circuits; and
selecting the data packets for transmission according to a predefined scheduling scheme based on the priority information.

22. The method of claim 21, further comprising:
selecting the data packets for transmission which are assigned priority information indicating the highest priority.

23. The method of claim 22, further comprising:
changing the priority information assigned to the data packets for the re-scheduled transmission to increase the transmission priority of the data packets.

* * * * *